US005963253A

United States Patent [19]

Dwyer

[11] Patent Number: 5,963,253

[45] Date of Patent: Oct. 5, 1999

[54] LIGHT SENSOR AND THRESHOLDING METHOD FOR MINIMIZING TRANSMISSION OF REDUNDANT DATA

[75] Inventor: Douglas Dwyer, Brea, Calif.

[73] Assignee: Raytheon Company, Lexington, Mass.

[21] Appl. No.: 08/785,183

[22] Filed: Jan. 17, 1997

[51] Int. Cl.[6] .................... H04N 5/225

[52] U.S. Cl. .................... 348/362; 348/149

[58] Field of Search .................... 348/143, 148, 348/149, 157, 362, 363, 366, 370, 61, 64

[56] References Cited

U.S. PATENT DOCUMENTS

| | | | |
|---|---|---|---|
| 5,086,314 | 2/1992 | Aoki et al. | 354/412 |
| 5,742,340 | 4/1998 | Alves | 348/255 |
| 5,809,161 | 9/1998 | Auty et al. | 382/104 |

*Primary Examiner*—Wendy Garber
*Assistant Examiner*—Mitchell White
*Attorney, Agent, or Firm*—Daly, Crowley & Mofford, LLP

[57] ABSTRACT

A thresholding method and improved light sensor that reduce the processing requirements of processors used to control the shutter, gain, and pedestal settings of license plate cameras employed in a toll road revenue collection system. The thresholding method and light sensor reduce the amount of data transmitted from the light sensor to the processor which controls the shutter, gain, and pedestal settings of license plate cameras of the toll road collection system. To minimize the redundant transmission and processing of data by the processor, a threshold comparator is used in the light sensor that only transmits data when the light level changes enough to exceed or fall below a programmable threshold. The threshold is programmed by the processor using a microprocessor. Thus, data is only transmitted when lighting conditions change, and transmission of redundant data is therefore eliminated.

20 Claims, 4 Drawing Sheets

LIGHT SENSOR AND THRESHOLDING METHOD FOR MINIMIZING TRANSMISSION OF REDUNDANT DATA

BACKGROUND

The present invention relates generally to light sensors, and more particularly, to a light sensor and thresholding method for use with a toll road revenue collection system that minimizes transmission of redundant data between the light sensor and a processor that controls the contrast level of images produced by a license plate camera.

The assignee of the present invention has developed an open road toll road revenue collection system wherein vehicles do not have to stop at a toll booth or collection station to pay toll fees. Each vehicle may be equipped with a transponder that transmits identification data to the system that is used to determine the time of entry into and exit from the toll road and to bill the owner of the transponder. However, casual users having vehicles that do not have a transponder may also use the toll road. In these cases, the toll collection system uses one or more license plate cameras to image the vehicle license plate, and the image is processed to determine the owner of the vehicle that is to be billed. The light sensor is used in capturing a readable image of the license plate.

Therefore, in cases of non-transponder equipped vehicles, the vehicle license plate must be accurately imaged, recorded, and processed to ensure proper billing. This must be done in all types of weather conditions, and in particular, during constantly changing sun conditions. If a cloud moves in front of the sun, it quickly changes the power level incident on the vehicle license plate, and this requires that the shutter, gain, and pedestal settings of the cameras be rapidly changed to properly image the vehicle license plate. The pedestal setting of the camera refers to black level definition.

Furthermore, vehicles entering and exiting the toll road may travel very quickly, and the amount of time available to image the license plate is small. Consequently, the shutter, gain, and pedestal settings of the license plate camera, and hence the contrast level between the background and the vehicle license plate, must be changed quickly to ensure the best image quality. Such contrast changes occur randomly, and are a function of local weather conditions.

To control the contrast level of the image viewed by the license plate camera, a light sensor is used to monitor the power output from the sun which provides message reports to a processor that controls the shutter, gain, and pedestal settings of the license plate camera. The light sensor is designed to look at a replica of a license plate, which reflects the sun's power into the light sensor. The light sensor is aimed in the same direction as the license plate camera, and is designed so that it senses the same relative light power as the camera. Therefore, changes in the sun's power level reflected from the replica license plate sensed by the light sensor are used to control the shutter, gain, and pedestal settings of the license plate camera so that the actual vehicle license plates are properly imaged thereby.

A previously developed light sensor used for this purpose was designed to transmit a message report every one-tenth of a second. This results in the transmission of 36,000 message reports per hour, which are sent to the host processor for processing. When using the previously developed light sensor, data was continuously transmitted between the light sensor and the processor, even at night. This volume of message reports required the processor to decode and process redundant data. It was therefore determined that it would be advantageous to reduce the overall processing requirements of the processor resulting from data transmitted by the light sensor.

Accordingly, it is an objective of the present invention to provide for a light sensor and thresholding method that minimizes transmission of redundant data between a light sensor and a processor that controls the shutter, gain, and pedestal settings of a license plate camera and thus reduces the processing requirements of the processor. It is a further objective of the present invention to provide for a light sensor that reduces the processing requirements of processors used in a toll road revenue collection system.

SUMMARY OF THE INVENTION

To meet the above and other objectives, the present invention provides for a thresholding method and light sensor that reduce processing requirements of processors used to control shutter, gain, and pedestal settings of license plate cameras employed in a toll road revenue collection system developed by the assignee of the present invention.

The thresholding method and improved light sensor reduce the amount of data transmitted from the light sensor to the processor that is processed to control the shutter, gain, and pedestal settings of license plate cameras of the toll road revenue collection system. To minimize the redundant transmission and processing of data by the processor, a threshold comparator is used in the light sensor so that it only transmits data when the light level changes enough to transition across (exceed or fall below) a programmable threshold. The threshold is programmed by the processor using a microprocessor. For example, when a cloud blocks the sun, the light energy sensed by the light sensor will change by a significant amount and cause the processor to adjust the camera settings to obtain a clear image. Similarly, when the cloud moves to expose the sun, the light intensity change sensed by the light sensor will again cause the processor to readjust the camera settings to obtain a clear image. Thus, data is only transmitted when lighting conditions change. Transmission of redundant data is therefore eliminated. In an embodiment of the light sensor that has been reduced to practice, the number of message reports output from the light sensor has been reduced from 36,000 message reports per hour to less than 1000 message reports per hour.

The thresholding method and improved light sensor use a programmable threshold that may be programmed to optimize the tolerance of the light sensor to the processing requirements of the processor. The present invention also allows the time interval between data reports sent to the processor to be programmed into the light sensor from the processor. The present invention provides for a light sensor that is adaptable to requirements that may different for different applications and conditions.

The light sensor outputs message reports to the processor that are indicative of the lighting conditions at the toll collection site. The processor uses the message reports to adjust the shutter, gain, and pedestal settings of the license plate cameras. The present invention eliminates transmission of redundant message reports from the light sensor to the processor and therefore minimizes the amount of data processing required by the processor. The threshold may be set, such that a new message report is transmitted only when the light level has changed enough to affect the performance of the license plate cameras. The threshold and data rate control mechanisms used in the present invention allow the light sensor to be used a variety of systems that require message reports, but cannot continuously decode the message reports.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
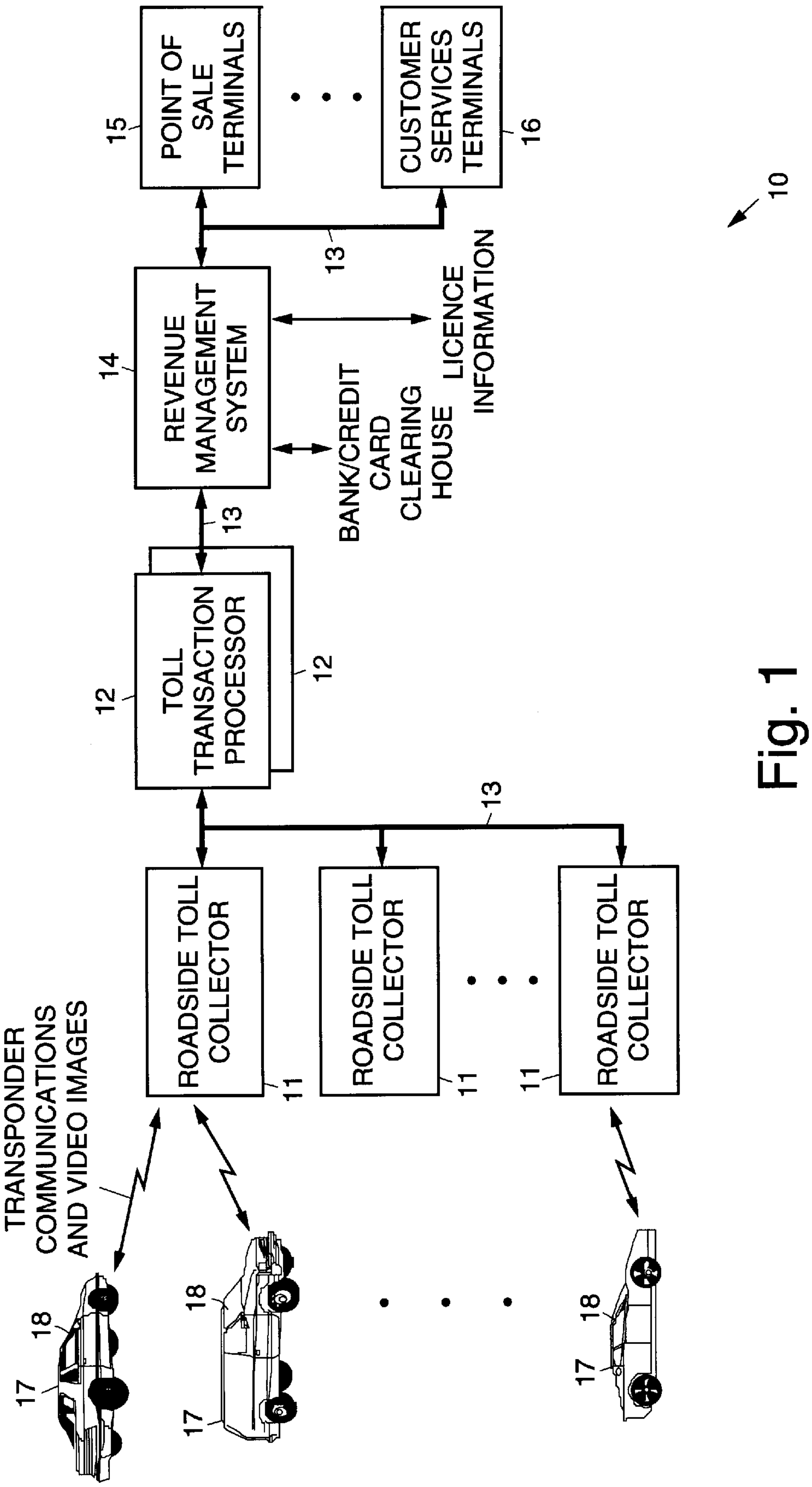
FIG. 1 illustrates a system block diagram of an open road toll collection system employing a light sensor and data thresholding method in accordance with the principles of the present invention.

Referring to the drawing figures, FIG. 1 illustrates an open road toll collection system 10 in accordance with the principles of the present invention. The system 10 comprises a plurality of roadside toll collectors 11, or roadside toll collection systems 11, that are coupled by way of a fiber optic network 13 to one and preferably two redundant toll transaction processors 12. The toll transaction processors 12 are coupled by way of the fiber optic network 13 to a revenue management system 14 that interfaces with computers of an appropriate motor vehicle authority to obtain license information regarding vehicles 17, and bank and credit card clearing houses to process bills and receive payments. The revenue management system 14 is coupled by way of the fiber optic network 13 to point of sale terminals 15 and customer service terminals 16.

Figure 2A:
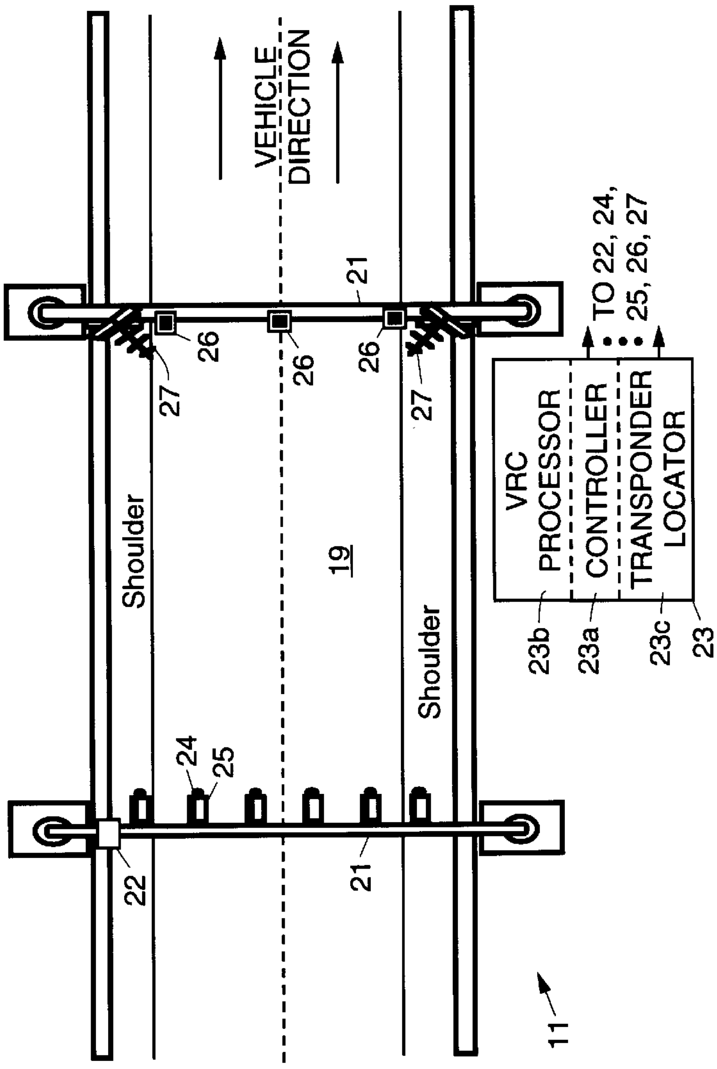
FIGS. 2*a* and 2*b* illustrate top and side views, respectively, of an embodiment of a roadside toll collector employed in the system of FIG. 1.
Figure 2B:
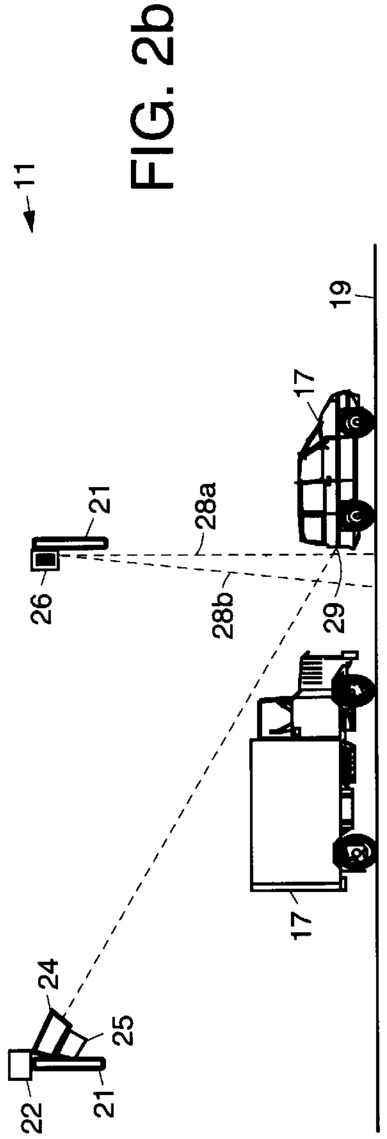

Vehicles 17 may contain windshield-mounted transponders 18 that communicate with one of the roadside toll collectors 11 upon entry to and exit from a toll road 19 (FIGS. 2*a* and 2*b*). The transponder 18 transmits identification data to the roadside toll collectors 11 that is processed to determine the time of entry into and exit from the toll road 19. This entry and exit data is processed by the toll transaction processors 12 and forwarded to the revenue management system 14 to bill the owner of the transponder 18.

However, the present system 10 also permits vehicles 17 that are not equipped with a transponder 18 to also use the toll road 19. In such cases, the system 10 has license plate cameras 24 that image the license plates 29 of the vehicles 17 (as will be described with reference to FIGS. 2*a* and 2*b*), and the images of the license plates 29 are processed to determine the time of entry into and exit from the toll road 19 and to bill registered owners of the vehicles 17 or generate violation notices, if required.

Referring to FIGS. 2*a* and 2*b*, they illustrate top and side views, respectively, of an embodiment of the roadside toll collector 11 employed in the system 10 of FIG. 1. The roadside toll collector 11 has two gantries 21 that span the entry and exit lanes of the toll road 19. One or more license plate cameras 24 are located on the first gantry 21 that is passed by the vehicles 17 that are used to image the license plates 29 of non-transponder equipped vehicles 17. Lights 25 are also disposed on the first gantry 21 that illuminate the license plates 29 of non-transponder equipped vehicles 17 in low light level conditions.

A plurality of vehicle detector and classification systems 26 are disposed on the second gantry 21 along with a plurality of RF antennas 27 that transmit and receive RF signals that are used to communicate with the transponders 18 in transponder equipped vehicles 17. Each of the vehicle detector and classification systems 26 use a laser-based sensor to generate a dual fan-beam scanning laser beam that is used to determine the position, speed, height, length and profile of vehicles 17 as they pass a toll collection zone.

A roadside control station 23 is located adjacent to the toll road 19 in the vicinity of the gantries 21. The roadside control station 23 comprises a controller 23*a*, a vehicle-roadside communications (VRC) processor 23*b*, and a transponder locator 23*c*. The controller 23*a*, vehicle-to-roadside communications processor 23*b*, and transponder locator 23*c* are coupled to each other and transmit data and commands therebetween as required to process transactions with the roadside toll collector 11. The controller 23*a* is also coupled to the license plate cameras 24, the lights 25, the light sensor 22, and the vehicle detector and classification systems 26.

The vehicle detector and classification system 26 employed in a reduced to practice embodiment of the system 10 is manufactured by Schwartz Electro Optics. The messaging interface used for vehicle detection employed in the system 10 is described in U.S. Pat. No. 5,491,713 assigned to the assignee of the present invention. The transponder locator 23*c* employed in the system 10 is described in U.S. Pat. No. 5,227,803 assigned to the assignee of the present invention.

The transponders 18 each have a unique ID number or ID code assigned to them, which is used for identification purposes. The transponders 18 communicate with the transponder locators using a "Slotted Aloha" Time Division Multiple Access (TDMA) communications protocol that permits communication with a large numbers of transponders 18 at the same time, and performance of the system 10 using this protocol is independent of lane position of the vehicles 17. Successful communications is possible with closely spaced vehicles 17 at speeds up to about 150 miles per hour. The Slotted Aloha TDMA communications protocol is described in U.S. Pat. Nos. 5,307,349 and 5,425,032, assigned to the assignee of the present invention. Each of the above-cited U.S. patents is incorporated herein by reference in their entirety.

The transponders 18 operate in the 902–928 MHz band, and at a nominal frequency of 915 MHz. The transponder messages contains 512 binary digits (bits) of data memory, and a Manchester encoding technique is used for data communications. The data communications rate is about 500 kilobits per second.

The transponders 18 have a factory-programmed read-only data field consisting of 32 public bits and 32 private bits. This read-only data storage is designed so that it permanently stores the ID code or serial number code in the transponder 18. However, only the 32-bit public ID can be read out of the transponder 18. The transponders 18 also have agency reprogrammable data fields that may be used to store agency and vehicle classification information. The transponders 18 have a scratch pad memory that permit various communications functions. The main function of the scratch pad memory is to store toll road entry data to the exit for toll amount determination and transaction completion.

A light sensor 22 that is part of the roadside toll collector 11 is disposed on the first gantry 21 is used to monitor the light intensity at the roadside toll collector 11 and provide feedback signals to the controller 23*a*. The feedback signals are used to control shutter, gain, and pedestal settings of the license plate cameras 24 during changing lighting conditions when the quality of the imaged license plates 29 are impacted by the changing lighting conditions.

In accordance with the present invention, to minimize redundant transmission and processing of data by the controller 23*a*, a threshold comparator is provided in the light sensor 22 so that it only transmits message reports when the sensed data changes enough to exceed or fall below a programmable threshold. In addition, the time interval between message reports sent to the VRC processor 23*b* may be programmed into the light sensor from the controller 23*a*. The programmable threshold may be programmed into the light sensor 22 to optimize the tolerance of the light sensor 22 to the processing requirements of the roadside toll collector 11. For example, when a cloud blocks the sun, the light energy sensed by the light sensor 22 will change by an amount that will cause the processor 23*b* to adjust the settings of the camera 24 to obtain a clear image. Similarly, when the cloud moves to expose the sun, the light intensity change sensed by the light sensor 22 will cause the processor 23*b* to readjust the settings of the camera 24 to obtain a clear image. Because the threshold is programmable, the present invention provides for a light sensor 22 that is adaptable to meet differing requirements for many applications and conditions.

Thus, message reports are only transmitted when lighting conditions change, and transmission of redundant data is eliminated. In an embodiment of the light sensor 22 that has been reduced to practice, the number of message reports transmitted from the light sensor 22 to the VRC processor 23*b* has been reduced from 36,000 message reports per hour to less than 1000 message reports per hour.

Figure 3:
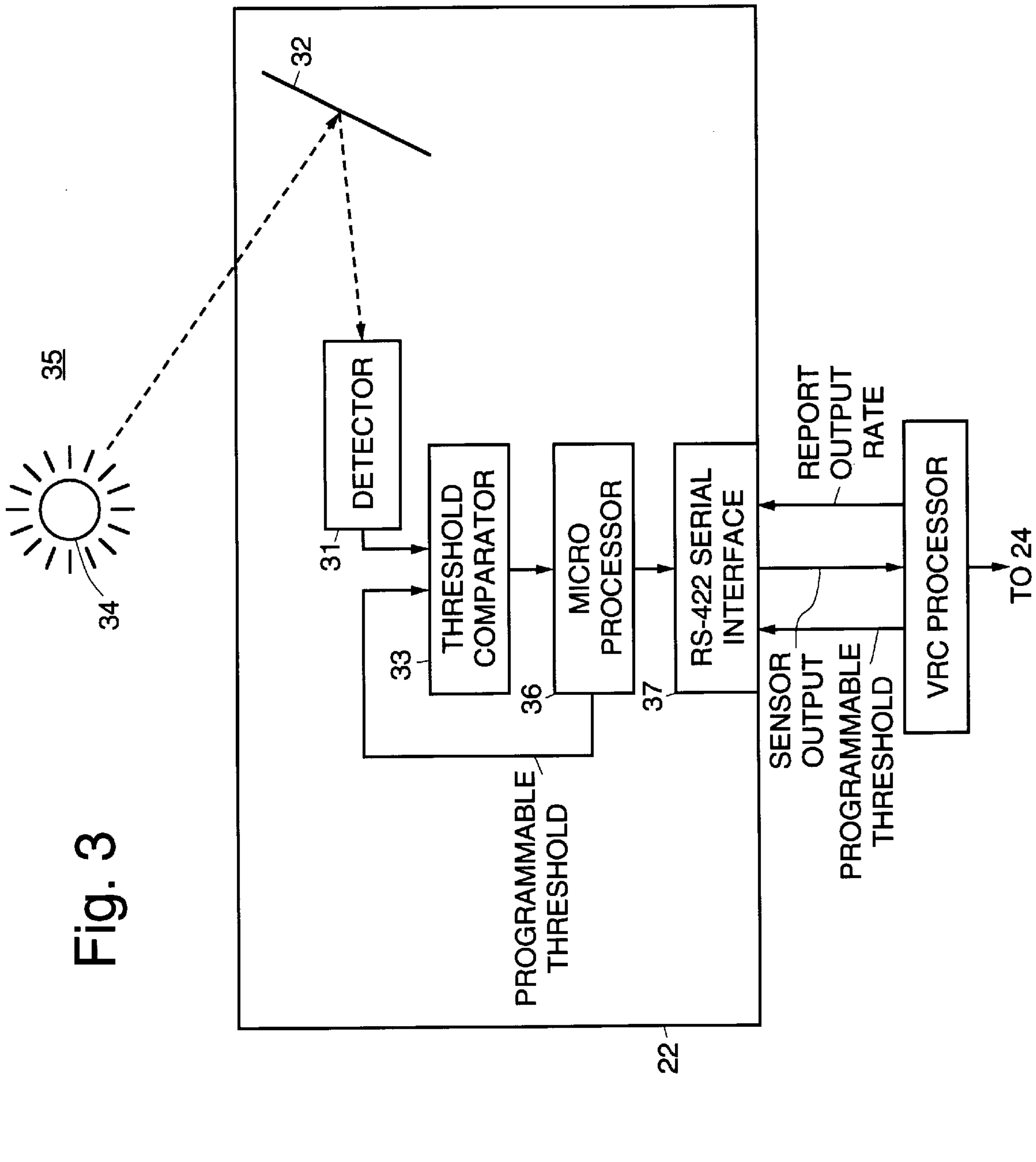
FIG. 3 illustrates a block diagram of the light sensor of the present invention.

Referring to FIG. 3, it illustrates a block diagram of the light sensor 22 used in the present invention. The light sensor 22 comprises a light detector 31 that views a replica license plate 32 that reflects light energy from the sky 34 and sun 35 into the light detector 31. The light sensor 22 is aligned in the same direction as the license plate cameras 24, and is designed so that it senses the same relative light power on the license plate of the vehicle. Therefore, changes in the ambient intensity level or power reflected from the replica license plate 22 are sensed by the light detector 31, and are transmitted as message reports to the controller 23*a*.

The light detector 31 is coupled to a programmable threshold detector 33 or threshold comparator 33 whose output is coupled to a microprocessor 36. The microprocessor 36 is coupled to an RS-422 transmit and receive serial interface 36. The RS-422 transmit and receive serial interface 36 operates at a data rate of 9600 bits per second, 8 data bits, 1 start bit, 1 stop bit, and no parity, that is used to communicate with the VRC processor 23*b*.

The light sensor 22 generates a message report represented as a 16 bit binary number. The light sensor 22 is calibrated to be accurate to ±1 the least significant bit for the same lighting condition. The output of the light sensor 22 is commanded by way of the microprocessor 36 from the controller 23*a* to suppress transmission of message reports unless the light level has changed to an extent that is significant enough to impact the current status of the VRC processor 23*b* or the images generated by one of the cameras 24. The microprocessor 36 sets the programmable threshold of the programmable threshold comparator 33 which then outputs signals from the light detector when the light level is below the threshold. In addition, the update rate at which message reports are transmitted over the RS-422 transmit and receive serial interface 36 is programmed via the microprocessor 36 to limit the number of message reports per minute that are sent to the VRC processor 23*b*.

The transmitted message reports are processed by the VRC processor 23*b* to generate control signals that are coupled to the license plate cameras 24. These control signals are used to adjust the shutter, gain, and pedestal settings of the license plate cameras 24 so that actual vehicle license plates are properly imaged under changing lighting conditions.

The light sensor 22, cameras 24, and controller 23*a* communicate using a message transmission protocol that uses command messages that are transmitted therebetween. These command messages include a threshold command message, two mute/send command messages, an update rate command message, and a command accepted message. A description of each of these messages is provided below.

The threshold command message has a message direction that is from the VRC processor 23*b* to the light sensor 22. The message format of the threshold command message is given in the following table.

| Name | Description | Type | Size | Range/ value | Precision | Unit of measure |
|---|---|---|---|---|---|---|
| Message type | Report accepted message | Byte | 1 | fixed 04 HEX | N/A | N/A |
| Sequence number | Sequence number generated by the processor | Byte | 1 | 0–FF HEX | N/A | N/A |
| Threshold value | Numeric count representing a minimum change in light level | Byte | 1 | 0–FF HEX | N/A | N/A |

The threshold command message is used to set the noise threshold level from the controller 23*a*. The default value from power-on is 16. The threshold value is used to compare a current light level with a previously transmitted light level. If a change in light level exceeds or falls below the threshold value, the light sensor 22 transmits a light data report in the next available reporting time. The light sensor 22 responds with a command accepted message or command rejected message within 250 ms.

One mute/send command message has a message direction that is from the host computer to the light sensor. The message format of the mute/send command message is given in the following table.

| Name | Description | Type | Size | Range/ value | Precision | Unit of measure |
|---|---|---|---|---|---|---|
| Message type | Mute/send command | Byte | 1 | fixed 01 HEX | N/A | N/A |
| Sequence number | A sequence number generated by the processor | Byte | 1 | 0–FF HEX | N/A | N/A |
| Enable/ disable | 0 = Mute 1 = Send light report message | Byte | 1 | 0 to 1 | N/A | N/A |

This message allows the controller 23*a* to enable or disable light data reports from the light sensor 22. The light sensor 22 powers up in the mute mode. The light sensor 22 transmits a command accepted message or a command rejected message with a corresponding sequence number within 250 ms.

The update rate command message has a message direction that is from the controller 23*a* to the light sensor 22. The message format of the update rate command message is given in the following table.

| Name | Description | Type | Size | Range/ value | Precision | Unit of measure |
|---|---|---|---|---|---|---|
| Message type | Update rate command | Byte | 1 | fixed 03 HEX | N/A | N/A |
| Sequence number | Sequence number generated by the processor | Byte | 1 | 0–FF HEX | N/A | N/A |
| Update rate | Defines the minimum time interval at which the light sensor transmits data | Byte | 1 | 100 ms to 25.5 sec. | 1 | 100 ms |

The update rate command is used change the light data report output rate. The power up default is 100 ms. The light sensor 22 transmits a command accepted message or command rejected message within 250 ms.

The command accepted message has a message direction that is from the light sensor 22 to the VRC processor 23*b*. The message format of the command accepted message is given in the following table.

| Name | Description | Type | Size | Range/ value | Precision | Unit of measure |
|---|---|---|---|---|---|---|
| Message type | Command accepted | Byte | 1 | fixed F0 HEX | N/A | N/A |
| Sequence number | The sequence number of the message from the processor | Byte | 1 | 0–FF HEX | 1 | N/A |

The light sensor 22 generates a command accepted message whenever a valid command is transmitted from the VRC processor 23*b*. There is no response to the command accepted message.

Figure 4:
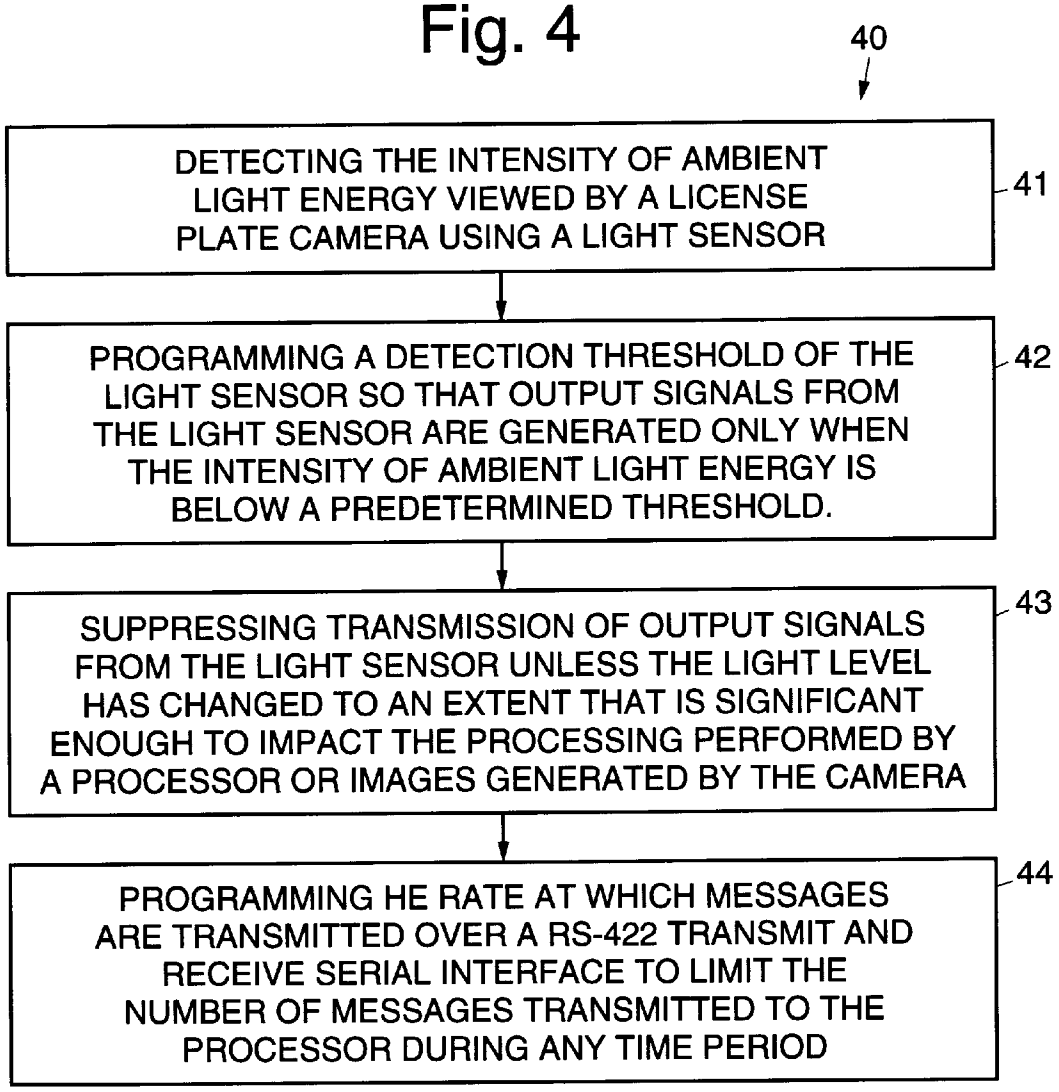
FIG. 4 is a block diagram of one embodiment of a data thresholding method in accordance with the principles of the present invention.

FIG. 4 is a block diagram of one embodiment of a data thresholding method 40 in accordance with the principles of the present invention. The data thresholding method 40 minimizes the amount of processing required of a processor 23*b* coupled to a light sensor 22 that controls the shutter, gain, and pedestal settings of the cameras 24 used to image a vehicle license plate 29, and hence adjusts the contrast level between the background and the vehicle license plate 29 to adapt the cameras 24 to varying lighting conditions. The data thresholding method 40 comprises the following steps. The intensity of ambient light energy viewed by a license plate cameras 24 is detected 41 by a light sensor 22. A detection threshold of the light sensor 22 is programmed 42 so that output signals from the light sensor 22 are generated only when the intensity of ambient light energy exceeds a predetermined threshold. To accomplish this, transmission of output signals from the light sensor 22 is suppressed 43 unless the light level has changed to an extent that is significant enough to impact the processing performed by the controller 23*a* or the images generated by the cameras 24. In addition, the rate at which message reports are transmitted over the RS-422 transmit and receive serial interface 36 is optionally programmed 44 to limit the number of message reports transmitted to the VRC processor 23*b* during any time period.

Thus, an improved light sensor and thresholding method have been disclosed that may be used with an open road toll road revenue collection system to minimize transmission of redundant data between the light sensor and a processor used to control the contrast level of images produced by a camera that monitors vehicle license plates have been disclosed. It is to be understood that the described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A light sensor employed in a toll road revenue collection system that minimizes transmission of redundant data between the light sensor and a processor that is used to control the contrast level of an image produced by a license plate camera used to image vehicle license plates, said light sensor comprising:

a replica license plate that reflects light energy from the sky and sun;

a light detector that views the replica license plate to sense changes in the ambient intensity level or power reflected from the replica license plate;

a programmable threshold comparator coupled to the light detector;

an RS-422 transmit and receive serial interface for communicating with the processor;

a microprocessor coupled to the programmable threshold comparator and the RS-422 interface for receiving commands from the processor by way of the RS-422 interface that set the programmable threshold of the comparator, and processing the output signals from the light detector to generate message reports that are transmitted to the processor only when the light level detected by the light detector transitions across the threshold;

and wherein the transmitted message reports are processed by the processor which, in response to the message reports, generates control signals that are coupled to the license plate camera to adjust the shutter, gain, and pedestal settings of the license plate camera so that actual vehicle license plates are properly imaged under changing lighting conditions.

2. The apparatus of claim 1 wherein the light sensor is aligned in the same direction as the license plate camera, and senses the same relative light power as the camera.

3. The apparatus of claim 1 wherein the RS-422 interface communicates with the processor at a data rate of 9600 bits per second, and has 8 data bits, 1 start bit, 1 stop bit, and no parity.

4. The apparatus of claim 1 wherein the microprocessor is programmable so that the rate at which message reports are transmitted over the RS-422 interface to the processor is programmed to limit the number of message reports sent to the processor during a given time period.

5. The apparatus of claim 1 wherein said programmable threshold comparator is responsive to a control signal from said microprocessor for adjusting the threshold of said comparator.

6. The apparatus of claim 1 wherein said programmable threshold comparator has an input coupled to said light detector and an output coupled to said microprocessor at which is provided an output signal indicative of the light energy reflected from the replica license plate transitioning across the threshold of said comparator.

7. A data thresholding method that minimizes the amount of processing required of a processor coupled to a light sensor that controls the shutter, gain, and pedestal settings of the cameras used to image a vehicle license plate, and hence adjusts the contrast level between the background and the vehicle license plate to adapt the cameras to varying lighting conditions, said method comprising the steps of:

detecting the intensity of ambient light energy viewed by a license plate camera using a light sensor;

programming a detection threshold of the light sensor so that output signals from the light sensor are generated only when the intensity of ambient light energy transitions across a predetermined threshold;

generating message reports from the light sensor when the ambient light energy transitions across the predetermined threshold;

transmitting the message reports to the processor; and generating control signals in the processor that are applied to the camera to adjust the shutter, gain, and pedestal settings of the camera to adapt the camera to the changed lighting condition.

8. The method of claim 7 wherein the step of programming a detection threshold of the light sensor comprises the step of:

suppressing transmission of message reports from the light sensor unless the light level has changed to an extent that is significant enough to impact processing performed by the processor or images generated by the camera.

9. The method of claim 7 further comprising the step of:

programming the update rate at which message reports are transmitted to the processor to limit the number of message reports transmitted during any time period.

10. The method of claim 7 wherein said detecting step includes the step of detecting the intensity of ambient light energy reflected from a replica license plate.

11. The method of claim 7 further comprising the step of changing the detection threshold of the light sensor in response to a control signal transmitted by said processor.

12. A light sensor employed in a toll road revenue collection system, said light sensor comprising:

a replica license plate that reflects ambient light energy;

a light detector that senses the ambient light energy reflected from the replica license plate; and a microprocessor responsive to the ambient light energy sensed by said light detector for generating message reports indicative of a change in the sensed ambient light energy sufficient to cause the sensed ambient light energy to transition across a predetermined threshold, wherein said message reports are utilized by said toll road revenue collection system for controlling a camera operable to image vehicle license plates.

13. The light sensor of claim 12 further comprising a programmable threshold comparator having an input coupled to an output of the light detector and providing an output signal to said microprocessor indicative of the sensed ambient light energy transitioning across said predetermined threshold.

14. The light sensor of claim 13 wherein said threshold comparator has a second input responsive to the predetermined threshold.

15. The light sensor of claim 13 wherein said microprocessor is responsive to a control signal for changing said predetermined threshold.

16. The light sensor of claim 12 wherein said microprocessor transmits said message reports to a processor of said toll road collection system which is operable to adjust settings of the camera.

17. The light sensor of claim 16 wherein said settings are selected from shutter, gain, and pedestal settings.

18. The light sensor of claim 16 wherein the rate at which said microprocessor transmits said message reports to said processor is programmable.

19. The light sensor of claim 18 wherein said microprocessor is responsive to a control signal provided by said processor for changing the rate at which said message reports are transmitted to said processor.

20. The light sensor of claim 12 wherein said microprocessor transmits said message reports to said processor only when the sensed ambient light energy transitions across the predetermined threshold.

* * * * *